United States Patent
Munger et al.

(10) Patent No.: US 9,720,238 B2
(45) Date of Patent: *Aug. 1, 2017

(54) METHOD AND APPARATUS FOR A DYNAMIC "REGION OF INTEREST" IN A DISPLAY SYSTEM

(71) Applicant: eSIGHT CORP., Kanata (CA)

(72) Inventors: Rejean Munger, Ottawa (CA); Robert Hilkes, Ottawa (CA); Marc Perron, Kanata (CA); Nirmal Sohi, Ottawa (CA)

(73) Assignee: eSight Corp., Kanata, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,790

(22) Filed: May 25, 2016

(65) Prior Publication Data

US 2016/0282624 A1    Sep. 29, 2016

Related U.S. Application Data

(63) Continuation of application No. 12/891,430, filed on Sep. 27, 2010, and a continuation-in-part of
(Continued)

(51) Int. Cl.
*G06K 9/36* (2006.01)
*G09G 5/00* (2006.01)
(Continued)

(52) U.S. Cl.
CPC ....... *G02B 27/0172* (2013.01); *G02B 27/017* (2013.01); *G06F 3/013* (2013.01); *G06T 7/11* (2017.01); *H04N 5/23296* (2013.01); *G02B 2027/014* (2013.01); *G02B 2027/0112* (2013.01); *G02B 2027/0118* (2013.01); *G02B 2027/0123* (2013.01);
(Continued)

(58) Field of Classification Search
None
See application file for complete search history.

(56) References Cited

U.S. PATENT DOCUMENTS

| 6,560,029 B1 * | 5/2003 | Dobbie | G02B 23/125 2/6.1 |
| 2002/0101568 A1 * | 8/2002 | Eberl | G02B 27/017 351/211 |

(Continued)

*Primary Examiner* — Sean Conner
(74) *Attorney, Agent, or Firm* — Rosenberg, Klein & Lee

(57) ABSTRACT

A method and apparatus of displaying a magnified image comprising obtaining an image of a scene using a camera with greater resolution than the display, and capturing the image in the native resolution of the display by either grouping pixels together, or by capturing a smaller region of interest whose pixel resolution matches that of the display. The invention also relates to a method whereby the location of the captured region of interest may be determined by external inputs such as the location of a person's gaze in the displayed unmagnified image, or coordinates from a computer mouse. The invention further relates to a method whereby a modified image can be superimposed on an unmodified image, in order to maintain the peripheral information or context from which the modified region of interest has been captured.

12 Claims, 11 Drawing Sheets

Related U.S. Application Data application No. 12/060,964, filed on Apr. 2, 2008, now Pat. No. 8,135,227.

(60) Provisional application No. 61/262,766, filed on Nov. 19, 2009, provisional application No. 60/921,468, filed on Apr. 2, 2007.

(51) Int. Cl.
  *G02B 27/01* (2006.01)
  *G06F 3/01* (2006.01)
  *H04N 5/232* (2006.01)
  *G06T 7/11* (2017.01)

(52) U.S. Cl.
  CPC ............... *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 2003/0058543 A1* | 3/2003 | Sheedy | G02B 27/0172 359/630 |
| 2005/0162512 A1* | 7/2005 | Seakins | G09B 21/00 348/62 |
| 2005/0254696 A1* | 11/2005 | Bacus | G01N 15/1475 382/128 |
| 2008/0084472 A1* | 4/2008 | Trudeau | G02B 27/017 348/51 |
| 2010/0033333 A1* | 2/2010 | Victor | A61B 3/113 340/576 |

* cited by examiner

Optical Prism 31

Front    Back

Original Image

Original Image with Gradient Applied

Gradient Applied and Original Image Suppressed

Original Image — Red Shifted to Blue — Green Shifted to Blue

Figure 9A — Figure 9B — Figure 9C

METHOD AND APPARATUS FOR A DYNAMIC "REGION OF INTEREST" IN A DISPLAY SYSTEM

CROSS-REFERENCE TO RELATED APPLICATIONS

This patent application claims benefit as a continuation of U.S. patent application Ser. No. 12/891,430 filed Sep. 27, 2010 entitled "Apparatus and Method for a Dynamic 'Region of Interest' in a Display System,", which claims the benefit of priority from U.S. Provisional Patent Application 61/262,766 filed Nov. 19, 2009 entitled "Apparatus and Method for a Dynamic 'Region of Interest' in a Display" and as a continuation-in-part from U.S. patent application Ser. No. 12/060,964 filed Apr. 2, 2008 entitled "Apparatus and Method for Augmenting Sight", which claims priority from U.S. Provisional Patent Application 60/921,468 filed Apr. 2, 2007 entitled "Apparatus and Method for Augmenting Sight."

FIELD OF THE INVENTION

The invention relates generally to the field of displays and more specifically to the field of vision care.

BACKGROUND OF THE INVENTION

There are numerous applications for lightweight head-worn near-to-eye displays. These are commonly called Head Mounted Displays (HMD). HMDs display to the eye an electronically rendered image such that the wearer perceives that they are watching a sizeable electronic display at some distance in front of them. The applications that use such HMDs are numerous, including but not limited to virtual reality, electronic gaming, simulation environments such as for military simulations or flight simulators, medical applications such as for the enhancement of sight, and consumer applications such as the ability to view videos in a mobile setting.

More and more of these applications can benefit from the incorporation of a live camera into the HMD, such that the wearer can not only view electronic data from a source, such as a video file, but also live video images of the world in front of them. Image processing can be used to enhance the live camera image before it is presented to the eye, providing magnification, enhancement of brightness, or improved contrast for example.

In applications which require a magnification function ("zoom"), HMDs have typically deployed optical lens systems to enlarge the image, at the expense of a loss of field of view (FOV) angle for the captured video image. This has many drawbacks including the physical size and weight of the zoom lens optics and associated drive motors. Also, optical zooming shrinks the captured field of view, so that much of the peripheral information in the image is lost. A loss of peripheral field of view has the further drawback of inducing disorientation or even nausea in the HMD wearer.

Implementations of a zoom function without the use of bulky, expensive optical lenses and motor drive systems, have attempted to magnify the image in software, using digital magnification techniques. In most situations this results in delay or latency between the time that the image is captured and the moment the magnified image is presented to the eye. Also, software zoom is only effective to a certain magnification factor, beyond which there is a significant degradation in the quality of the image. This is called lossy magnification.

What is needed then is a general device that is capable of providing significant zoom functionality with neither the bulk of zoom lens optics nor the latency and image quality degradation associated with software magnification while maintaining as much of the peripheral information as possible. Further, such a device should provide magnification or other image enhancements to an ROI defined according to the user's gaze coordinates, so that the context of the image is not lost.

SUMMARY OF THE INVENTION

The concept of performing zoom functions or other image enhancements on a reduced area of the displayed image corresponding with the wearer's interest, a "Region of Interest" (ROI), can be applied to either live video captured from a camera, or video from any other source. Having a ROI carries the advantage of maintaining the peripheral, contextual, "Field of View" information, while still providing the benefit of localized image enhancements and reducing possible latencies and lags. The coordinates of the wearer's interest, "gaze coordinates", which determine the location of the ROI in the displayed image, can be determined using an optical system that captures an image of the wearer's eye while they are looking at the display.

The invention, in one aspect, relates to a method of magnifying a portion of the image to be viewed by an individual. In one embodiment, the image sensor used to capture the image has a significantly higher pixel count, or resolution, than the display that is used to display the image. An image corresponding to the entire sensor image area can be captured at the same resolution as the display by grouping pixels together, otherwise called "binning". In this embodiment, the amount of magnification that is perceived by the wearer of the HMD is determined only by the ratio of the FOV between the camera optical system and the display optical system.

In another embodiment, a smaller window of pixels is selected on the image sensor which matches the pixel resolution of the display. This can result in an image presented to the wearer that has a significant level of magnification, with neither the use of additional zoom lens optics, nor the latency and degradation introduced by software zooming.

In yet another embodiment, the HMD wearer can be shown a window of some resolution matched between the display and the sensor but not the entire display size, otherwise called a region of interest (ROI). Outside of this ROI is shown the unmagnified entire FOV of the sensor. This is accomplished by alternately capturing the magnification window on the sensor and a full-field binned image, and combining these in the display.

In all of the above embodiments, by matching the pixel resolution of the captured image with the resolution of the display, the amount of data that must be processed between capturing the image and displaying it is optimized.

In a further embodiment, the camera can capture a high resolution image using all the resolution available on the image sensor. This image is than subdivided in software into an ROI to which image modifications such as magnification can be applied, and an outside FOV, which appears with a different, typically lesser number of enhancements. In this embodiment, a still image could be captured and stored for later use in this manner. For example, the outer FOV image could have brightness and contrast enhanced, while the inner ROI image has enhanced brightness, contrast, and additionally some magnification applied.

In a further embodiment, two separate cameras can be used, one optimized to capture the ROI area of the resulting displayed image, and a second to capture the surrounding FOV area. These can be considered to be two cameras capturing the same image, but at different magnification levels and therefore, different FOV.

In a further embodiment, a transmissive display can be used. This is a display that the wearer can normally see through like normal glasses, until an image is projected. By using a transmissive display system, an ROI can be presented to an area of the display smaller than the entire FOV, and the area around the ROI can remain transparent. In other words, the FOV outside of the ROI is determined not by displaying a FOV image captured from the camera, but by simply looking through portion of the display not occupied by the ROI.

In a further embodiment, software magnification (zoom) techniques, while the result is a loss of image quality, could be used.

It is also possible that the location of the ROI can be determined by the wearer of the HMD, by tracking the coordinates of their gaze. In this manner, the ROI location can move dynamically around the overall FOV, according to the information in the image that the wearer wishes to see enhanced.

The above embodiments are not limited to video captured from an image sensor or camera system, but can also be applied to video from other sources including streaming video, stored video, image files, and so forth.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

FIGS. 9A through 9C depict the results of an image enhancement algorithm that improves the usability of an image for people with specific color deficiencies.

DETAILED DESCRIPTION

Figure 1A:
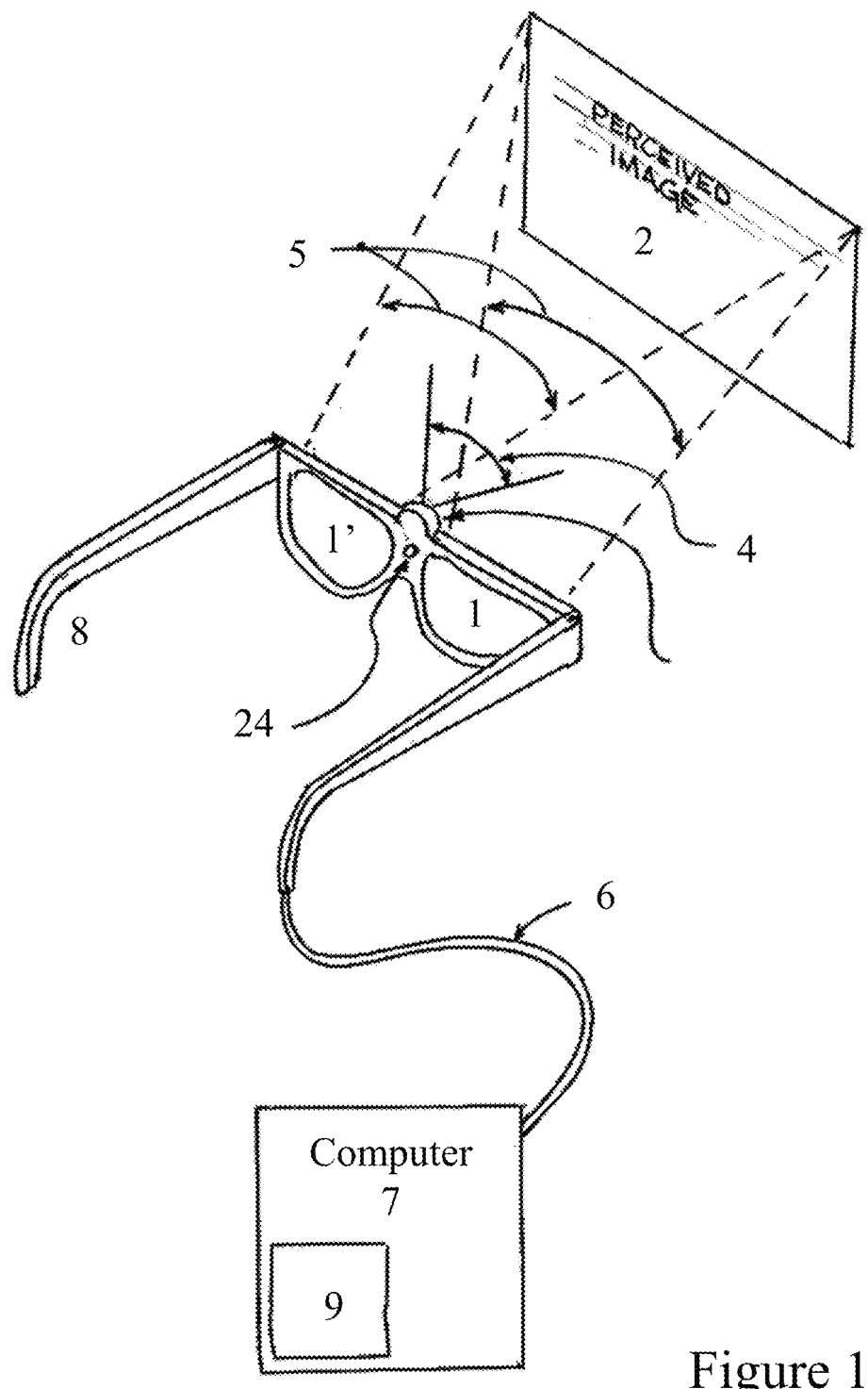
FIG. 1A is a highly schematic diagram of an embodiment of the system of the invention.

In brief overview and referring to FIG. 1A, the system in one embodiment includes a pair of eyeglass frames 8 or head mounted display and a processor 7. In this embodiment, the traditional transparent lenses in the eyeglasses frames 8, have been replaced with one or two display screens 1, 1' (generally 1). Attached to the frame are one or more image capture devices 3, such as a camera. The electronics provide for image capture by the image capture device and transmission to the processor 7 by way of a wired or wireless link 6. The processor 7 not only receives images from the image capture device 3, but transmits the modified images back to the eyeglass frames 8 for display on one or both of the display screens 1, 1'.

Figure 1B:
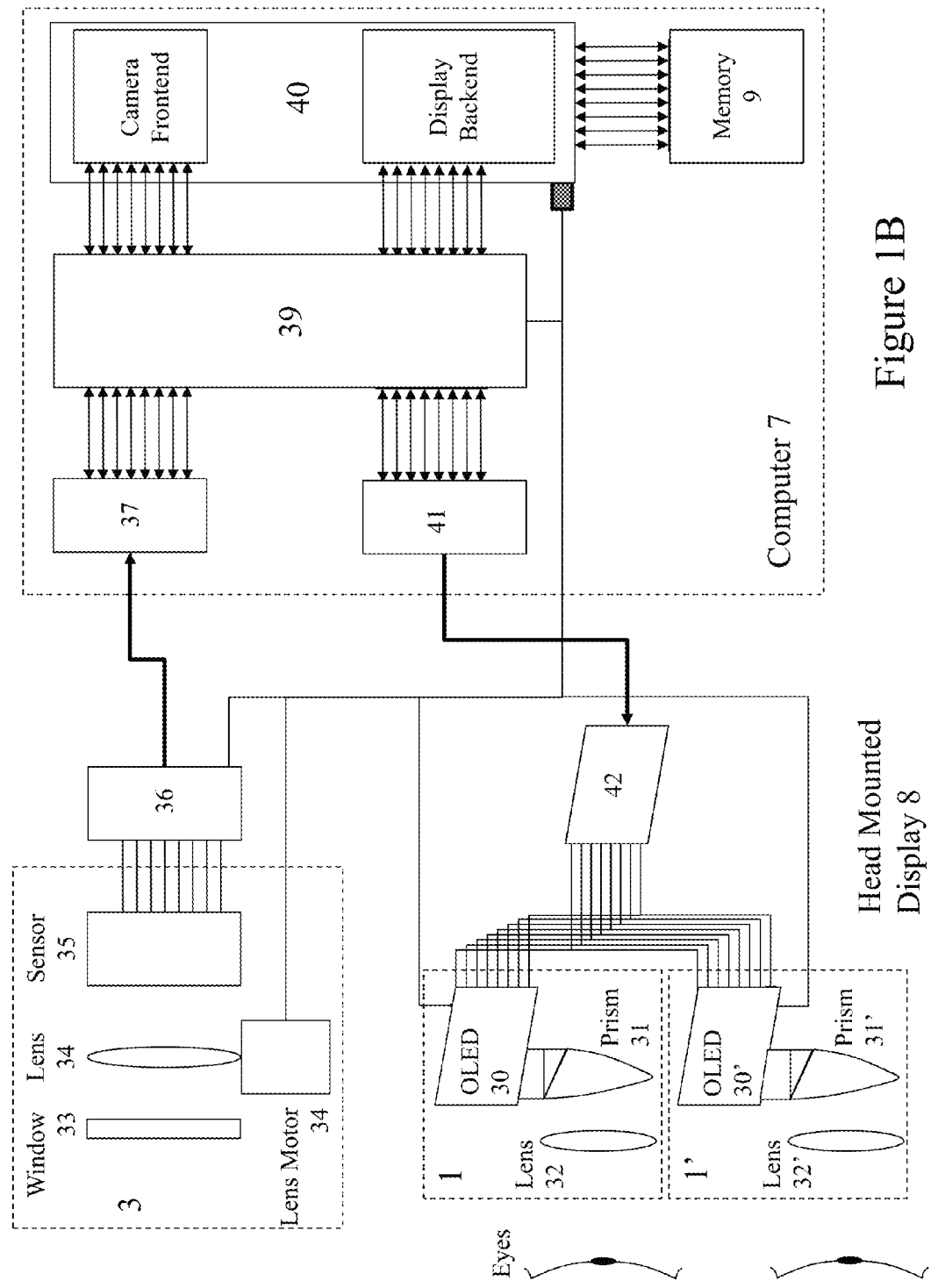
FIG. 1B is a more detailed schematic of one embodiment of the system of FIG. 1A.

In more detail as shown in FIG. 1B, in various embodiments, the displays 1, 1' in the eyeglass frames 8 include, in one embodiment, two Organic Light Emitting Diode (OLED) micro-displays for the left and right eyes 30, 30', and two optical prisms 31, 31' (generally 30), and finally two prescription lenses 32, 32'. In another embodiment, the displays use Liquid Crystal on Silicon (LCOS) technology. In a further embodiment, the displays use Liquid Crystal Display (LCD) technology. In still a further embodiment, the displays use micro-projection technology onto a reflective (partial or 100% reflective) glass lens. In various embodiments, each display shows a different image or the same image. If the modified image is to be displayed only to one eye, only one display 1 is required. The displays in various embodiments can incorporate refractive lenses 32, 32' similar to traditional eyeglasses, such that the display works in concert with a person's unique optical prescription.

Similarly, the image capture device 3 in one embodiment incorporates optical components 33 (window and lens) for focusing the image, a motor for controlling the focus position 34, and a Complementary Metal Oxide Semiconductor (CMOS) image sensor 35. In another embodiment, the image capture device is a charge coupled device (CCD) sensor with appropriate optics. In other various embodiments, the image capture device is any imaging device with an analog or digital signal output that can be sent to a processing unit 7 for processing. In one embodiment, the output of the sensor 35 is the input to a parallel to serial converter 36 for transmission over link 6 to the computer 7. A serial to parallel converter 37 provides parallel data to a field programmable gate array 39 which acts as the front end to CPU 40. In one embodiment, the processor 7 is a custom design based on the OMAP processor made by Texas Instruments (Dallas, Tex.).

The output display back end of CPU 40 again is the input to a field programmable gate array 39. The output of the gate array 39 is the parallel input to a parallel to serial converter 41. Serial data from the converter is transmitted over link 6 to a serial to parallel converter 42 located in the head mounted display 8. This data is transmitted to the OLED displays 30.

Figure 1D:
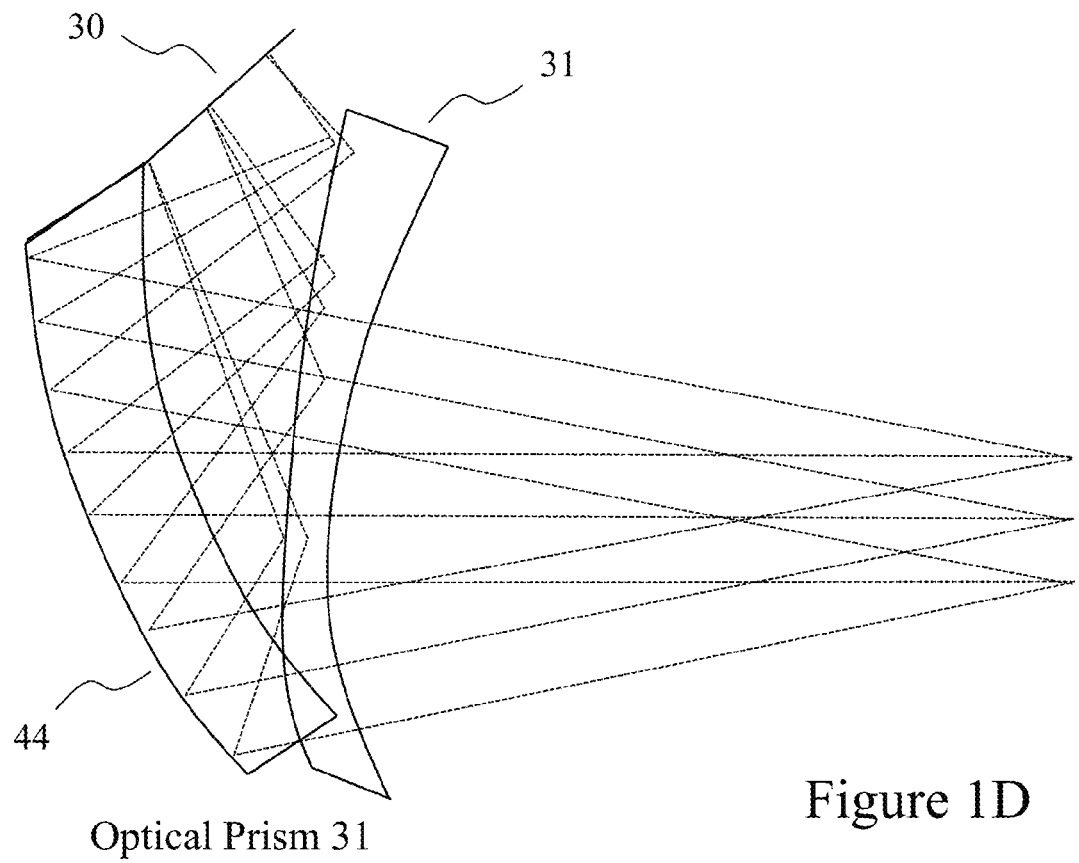
FIGS. 1C and 1D show a particular embodiment of an optical prism used to present to the eye, an image generated by a near-to-the-eye microdisplay.
Figure 1C:
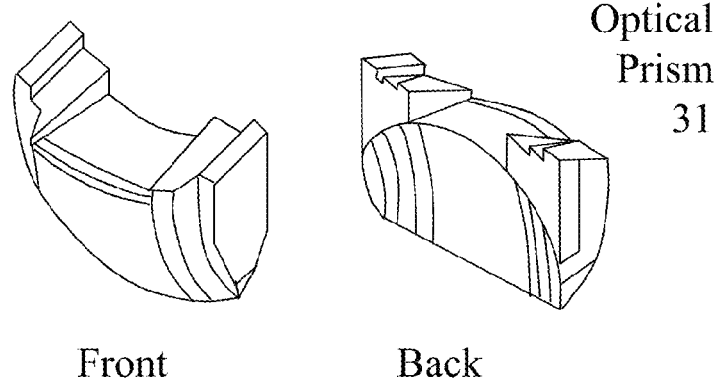

Referring to FIGS. 1C and 1D, each OLED 30 is attached to the mounting surface 43 of the optical prism 31 (FIG. 1C). Light from the OLED 30 entering the prism 31 (FIG. 1D) is folded and reflected off a reflecting surface 44 and focused, providing magnification.

In a binocular configuration, each image capture device or camera 3 sees a slightly different image, thereby providing stereoscopic vision to the viewer. If the image is to be presented to only one eye, then only one image capture device or camera 3 is needed to record the image for that eye. Although in the embodiment shown the image capture device or camera 3 and related electronics are mounted on the eyeglass frames 8, it is contemplated that the camera 3 and electronics could also be located elsewhere on the individual's person. Also, although two cameras 3 are contemplated for binocular vision, it is possible for one camera 3 to view the image and present the same image to both displays 1. In addition, in various other embodiments the source of the image may be another camera, a television, a computer or other source capable of supplying an input to the processor 7.

A further embodiment incorporates the processor 7 and associated electronics into the eyeglasses frame 8, eliminating the need for a communications link 6 between the two components of the system.

The optional eye tracking camera 24 is also in communication with the electronics and determines where in the visual field the individual is looking. In one embodiment, this camera 24 operates by following the position of the pupil. Such eye tracking devices 24 are common in presently available "heads-up-displays" utilized by military pilots. Again, although an embodiment contemplated includes two tracking cameras 24, because both eyes typically track together, one tracking device may be used. In another embodiment, the eye tracking sensor uses a combination of mirrors and prisms such that the optical path for the eye tracking sensor is orthogonal to the pupil. Eye tracking is used to determine the region of interest (ROI), and to ensure that the damaged areas of a person's vision are avoided when the modified image is presented to the eye. The eye-tracking information is suitably averaged and dampened in software to minimize the sensitivity to random eye movements, blinks, etc., and to optimize the system for various usage models. For example, reading English requires specific eye tracking performance in the left to right direction different from that in the right to left direction, and different again from that in the vertical direction.

Images from the image capture device 3, eye position information from the eye tracking camera 24 and images destined for the displays 1, 1' are passed through the processor 7. This communication between the processor 7 and the electronics of the eyeglass frames 8 may be transmitted through a wired connection 6 or be transmitted wirelessly. Certain functions, such as magnification, may be performed in an analog manner, such as by adjusting the lens array on the camera or digitally by mathematically processing pixels.

Received data and control instructions are then stored in memory 9. The memory 9 includes random access memory (RAM) for data storage and program execution, and read only memory (ROM) for program storage. The computer 7 accesses the data in memory and manipulates it in response to the control instructions for transmission back to the eyeglass frames 8 for display. In this way, the individual can tailor the displayed image for optimal viewing.

Figure 2:
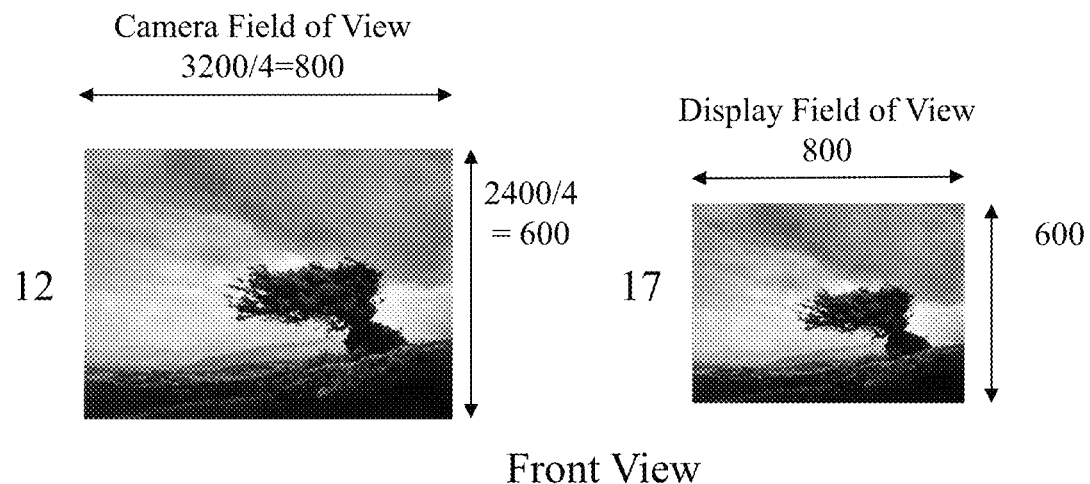
FIG. 2 is a diagram of the result of viewing a scene using the embodiment of the system of FIG. 1A, to capture a full field image at the display's native resolution via binning.
Figure 2:
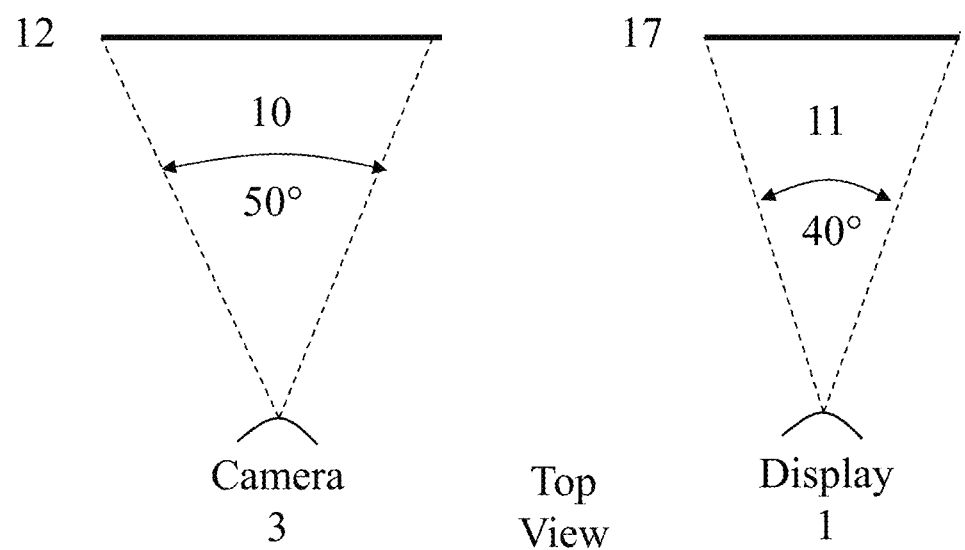

One embodiment of the method as shown in FIG. 2, the system captures a full field of view image 12 in the camera 3, at a resolution that exactly matches that of the display 1, as shown in FIG. 2. This setting of resolution in one embodiment is made by adjusting the camera resolution electronically. However, with a fast enough processor and memory, the resolution matching may take place by selection of pixels in memory. The image sensor is configured such that groups of pixels are grouped together or binned, resulting in a resolution that matches that of the display. In this particular example, the wearer perceives the image to be slightly reduced in size, as determined by the ratios of the camera FOV angle 4 (FIG. 1A) and 10 (FIG. 2) (in this case 50°) and the FOV angle 5 (FIG. 1A) and 11 (FIG. 2) of the perceived image 17 (in this case 40°).

Figure 3:
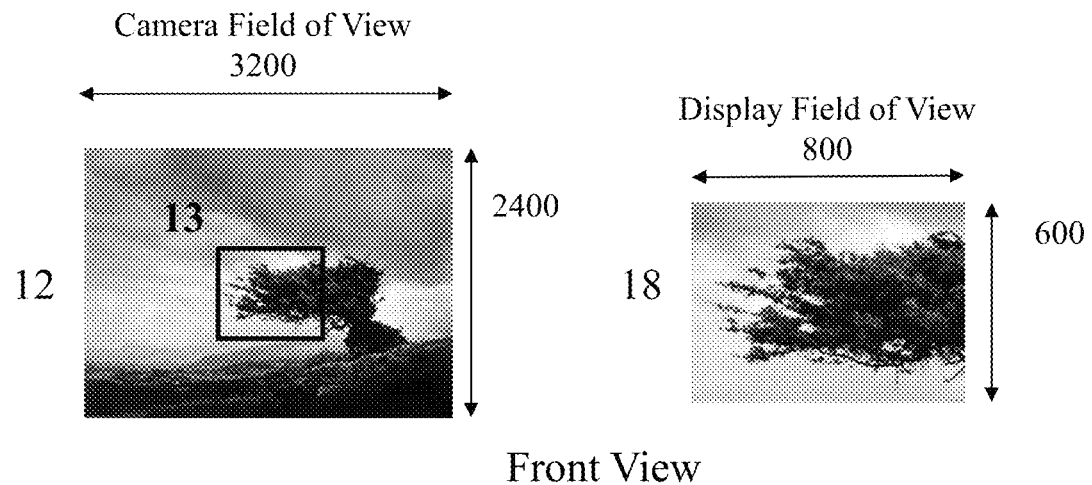
FIG. 3 is a diagram of the result of viewing a scene using the embodiment of the system of FIG. 1A, to capture a window from the image sensor that matches the full field resolution of the display.
Figure 3:
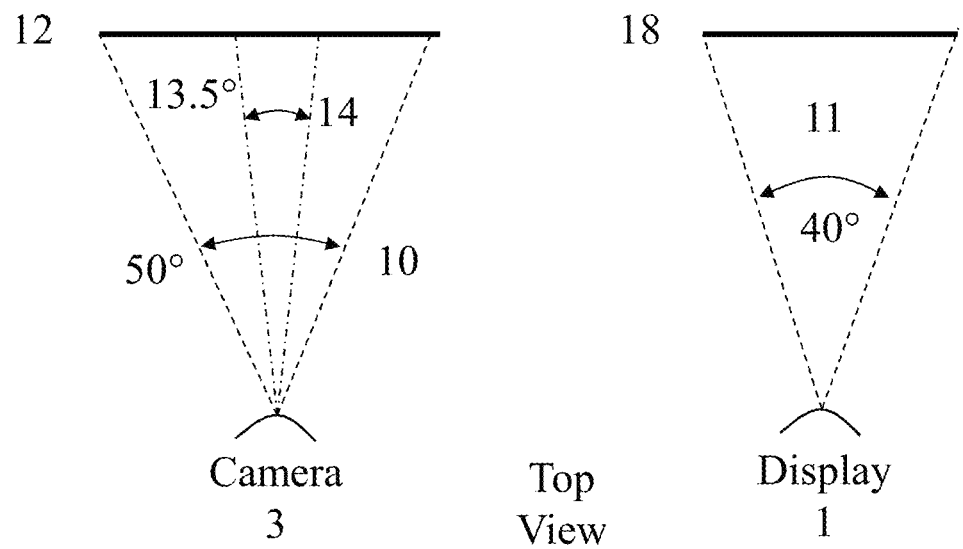

In another embodiment as shown in FIG. 3, the camera 3 captures an image where a region of pixels 13 in any area of the camera sensor is captured which exactly matches the resolution of the display 1. In this particular example, the wearer perceives the image 18 to be magnified, as determined by the ratios of the camera FOV angle 4 (FIG. 1A) and 14 (FIG. 3) for the captured area (in this case 13.5°) and the FOV angle 5 (FIG. 1A) and 11 (FIG. 3) of the perceived image 18 (in this case 40°).

Figure 4:
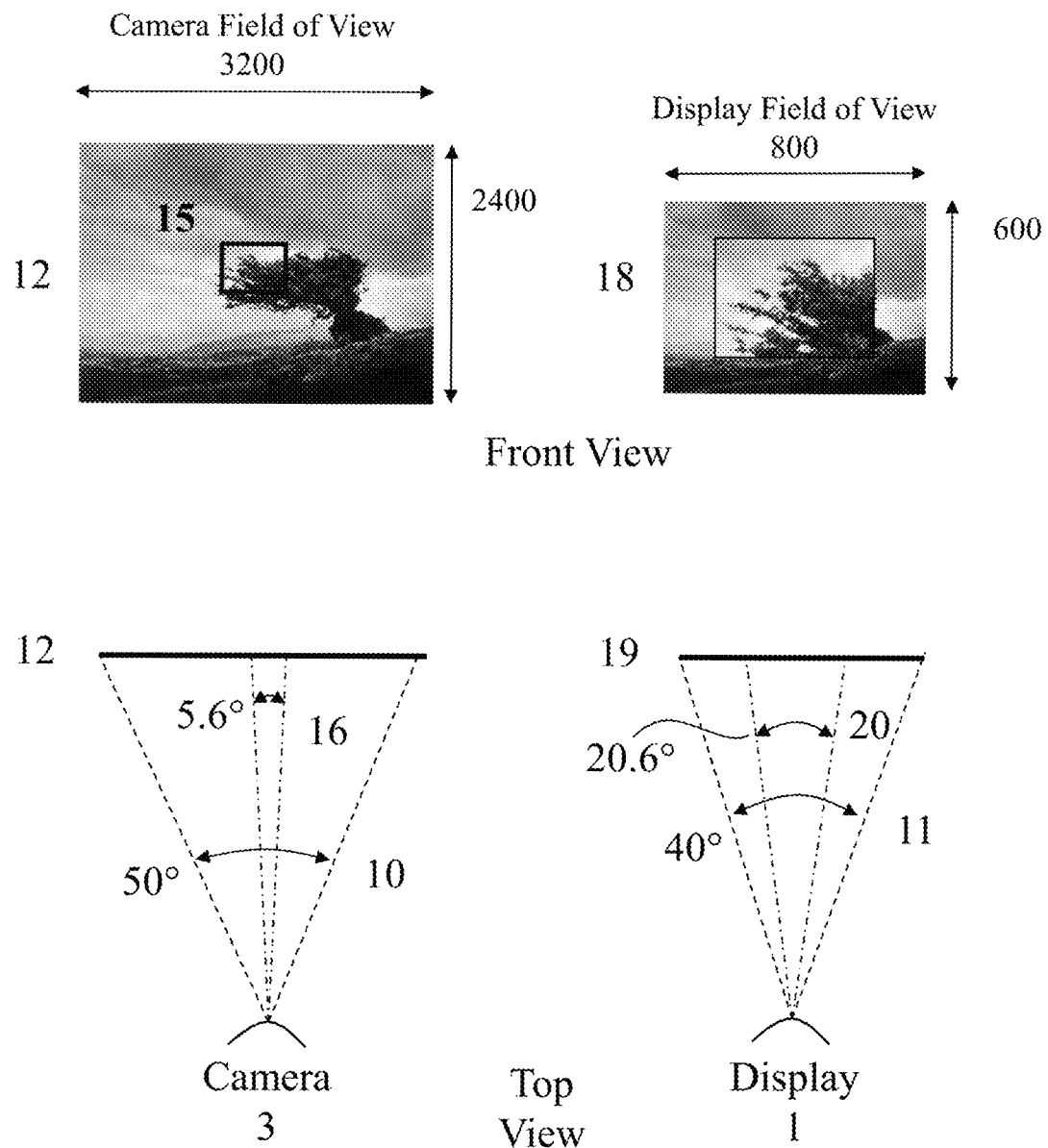
FIG. 4 is a diagram of the result of viewing a scene using the embodiment of the system of FIG. 1A, to capture a smaller window at some fraction of the display's resolution, and display it on a fraction of the display, with the full field of view image displayed in the periphery.

In another embodiment as shown in FIG. 4, the camera 3 captures an image of a region of interest (ROI) 15 in any area of the camera sensor which is actually smaller than the resolution of the display 1. This image is then shown in the display 1 using the same number of pixels, such that the wearer perceives a magnification as determined by the ratio of the FOV angle 4 (FIG. 1) and 16 (FIG. 4) (in this case (5.6°) of the captured image 15, and the FOV angle 5 (FIG. 1A) and 20 (FIG. 4) (in this case 20.6°) of the displayed image 21. By alternately capturing the entire camera FOV 12 and the ROI 15, the computer 7 can overlay the captured ROI 15 on top of the full-field image 12, such that the displayed image 19 shows both the unmagnified full-field image 19 with an overlayed, magnified ROI image 21. This technique maintains some peripheral field information or context, and can reduce fatigue and nausea in the wearer, as well as increase mobility. The capture rate of the ROI 15 can be higher than the capture rate of the FOV 12, such that the wearer receives a higher quality image for the ROI 21 than for the displayed FOV 19.

In yet another embodiment, the camera 3 captures an image of a region of interest (ROI) 15 in any area of the camera sensor. This image is then shown in the display 1, 1', where the size of the displayed ROI 21 is less than the overall display size. By using a transmissive display 1, 1', the wearer can view the FOV 19 information outside of the ROI 15 by simply looking through the unused portion of the display 1, 1'. In this manner, the camera only needs to capture the ROI image 15, and not the FOV image 12. The frame rate and image quality for the ROI can be very high, since the camera 3 and computer 7, do not need to process the FOV image 12.

The specific location of the ROI 13, 15 on the camera sensor, and its corresponding location 21 in the display are not necessarily fixed. There can be applications where the ROI 13, 15 is moved to any location with the overall camera FOV 12, as determined by the location of person's gaze at the display 1 for example, which is determined by the gaze tracking camera 24. By following their gaze in the overall display field of view 19, the displayed ROI 21 can show local magnification of the displayed image 19.

It is also possible that the location of the captured ROI location 13, 15 on the camera sensor, and its corresponding location 21 in the display can be determined by another technique such as a computer mouse for example.

Figure 5:
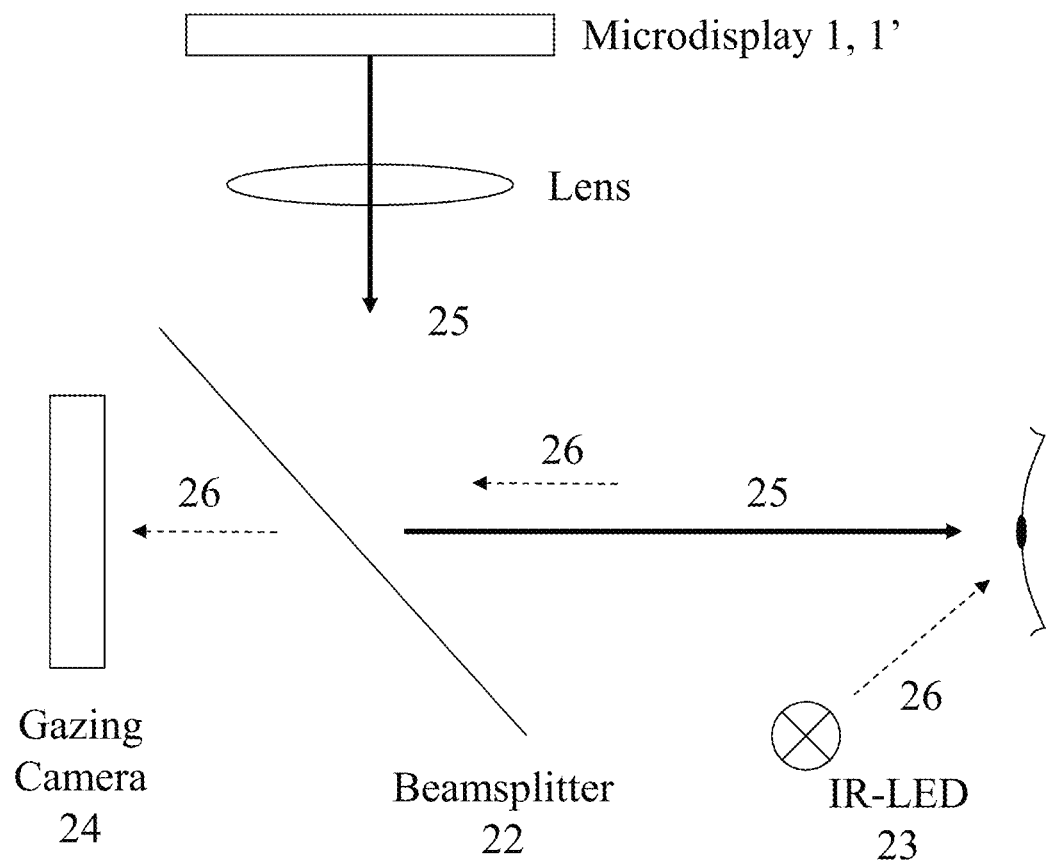
FIG. 5 is a diagram of an embodiment of an optical system that enables the coincident display of a visible light image to the wearer's eyes, and the capture of an infrared light image of the wearer's eye into a camera. By using a combination of beam splitting and reflective surfaces, the visible light and infrared light can share the same optical path orthogonal to the surface of the eye.

An embodiment of an optical system that can be used to determine the wearer's gaze coordinates is shown in FIG. 5. In this case, the displayed image 17, 18, 19 of the previous FIGS. 2, 3, and 4 respectively is passed through an optical beam splitter 22, which reflects the image to the wearer's eye. At the same time, a source of invisible light 26 such as light from an infrared source 23, illuminates the eye so that its image can be captured by a camera device 24. Infrared light 26 from the source 23 reflected off the eye's surface, often referred to as the Hirschberg reflex or first Purkinje image, passes through the beam splitter device 22, into the gaze tracking camera 24. Alternatively, the invisible light 26 could be reflected from the retinal surface of the eye.

Other embodiments of an optical system for capturing an image of the wearer's eye are possible, including swapping which of the optical paths, visible light 25 or invisible light 26 are reflected by or transmitted through the beam splitter device 22.

Once the ROI has been defined, various image enhancements can be applied beyond simple magnification as discussed. These enhancements can be changes in the brightness and contrast of the image. Edges can be sharpened. Colors can be remapped in accordance with the wearer's specific color deficiencies. Information in the ROI can even be remapped so that it is outside of the wearer's blind spot or scotoma.

The ratio by which the wearer is displayed the ROI 21 versus the FOV 19, can be determined in software so that the image quality of the ROI 21 is consistently superior to that of the FOV 19. This is especially useful when the ROI 21 is tracking the wearer's gaze, because their visual performance outside of the ROI 21 is substantially diminished, and so a high quality image is less important in the FOV area 19.

Figure 6A:
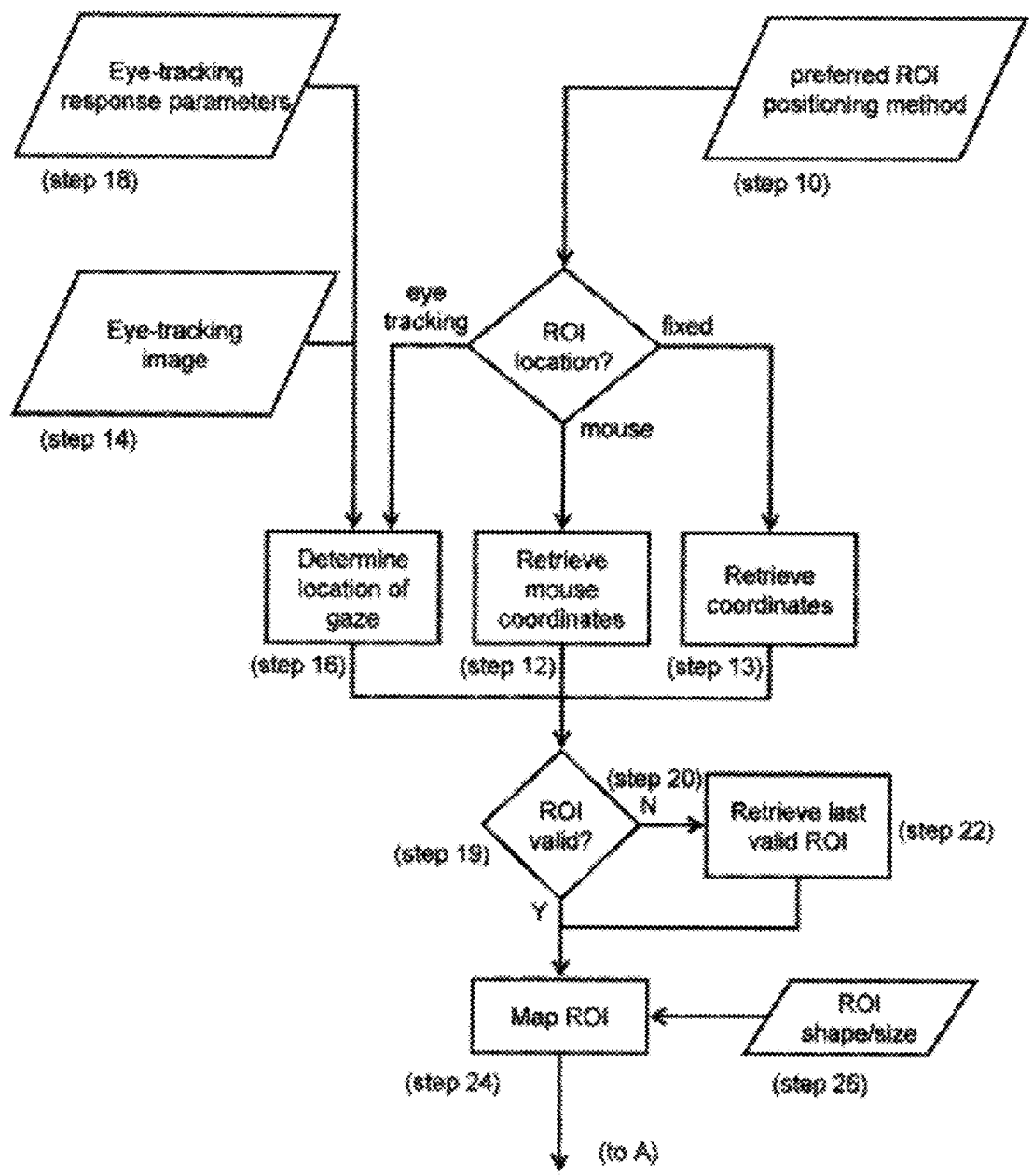
FIGS. 6A and 6B are a flowchart of an embodiment of a method describing how an image processing system can determine which image modifications to apply to the ROI and FOV respectively, based on input from the wearer or by determining the wearer's gaze coordinates.
Figure 6B:
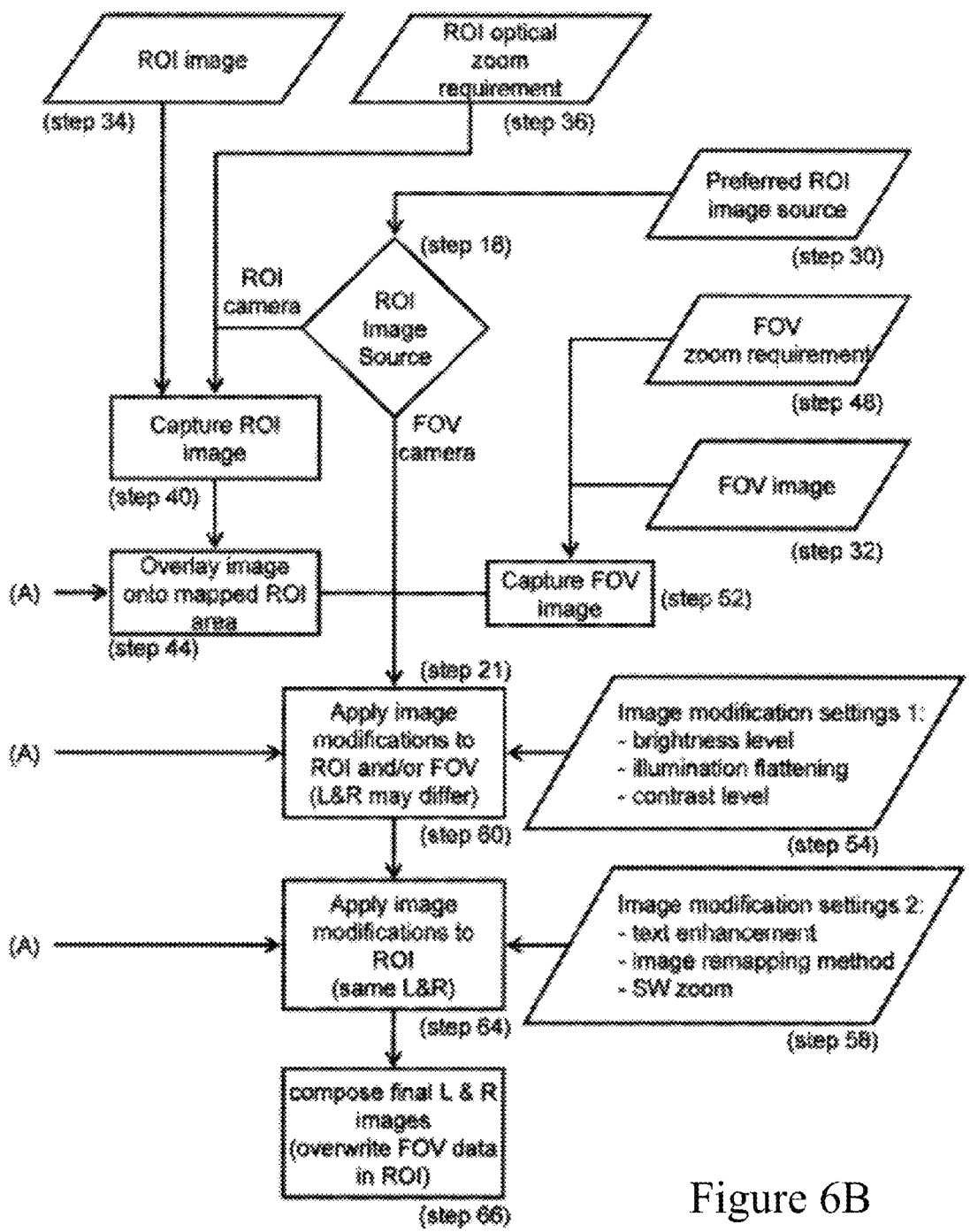

One embodiment of the method using the system which is capable of modifying an image of the field of view is shown in FIGS. 6A and 6B. The wearer begins by setting the preferred method of determining the location of the region of interest (ROI) through a keyboard or other input device (step 10). The individual may indicate their preferred location of the ROI by selecting one of a mouse input (step 12), preset coordinates (step 13) or eye-tracking imaging (step 14).

If an eye tracking sensor 24 is used, the individual need only move their eye to determine the region of interest (step 16). Some mathematical parameters are applied to determine the sensitivity of the eye tracking algorithm in the X and Y directions (step 18) to minimize the effect of involuntary eye movement on the choice of region of interest.

From this information, the center of the region of interest (ROI) is determined (step 19). If the region of interest (ROI) (step 20) is not within the area anticipated according to the eye-tracking sensitivity parameters (step 18), the region of interest is set to the last valid region of interest (step 22). The complete region of interest (ROI) is then determined, or "mapped" such that it is centered on the coordinates determined (step 24). The size and shape of the ROI is determined through user inputs (step 26).

The visual information in the region of interest (ROI) may be input from either the field of view (FOV) image (step 32), or from a separate region of interest image source (step 34), as determined by user input (step 30). If the ROI image is to come from a separate source (step 34), then the user can input an optical zoom requirement (step 36) for this image. The ROI image is then captured (step 40) and overlaid or mapped, onto the ROI area (step 44).

The individual sets the zoom requirement (step 48) for the field of view (FOV) image. The zoom function is a combination of both optical zoom done in the FOV camera using lenses, and digital zoom performed in software. The FOV image is then captured. (step 52).

The image is then modified (steps 54 and 58) as further required by the user input values. Note that some modifications are applied to the left and right displays, or left and right eyes, differently (step 60), while others are applied to the left and right displays equally (step 64). Any of the image modifications may be applied to either the region of interest (ROI) or the entire field of view (FOV), or both. The final modified images are then presented to the displays (step 66).

There are many image modifications that can be performed in the processor 7, on either the FOV or the ROI, or both, to improve the visual function of the person wearing the eyeglass frames 8. These include, but are not limited to:

1. Magnify the image—this function reduces the size of either the captured FOV 12, or the captured ROI 13, 15 or both, so that objects displayed to the wearer of the eyeglass frames 8, in either the FOV 17, 18, 19 or ROI 21 appear enlarged. Without any additional software magnification applied by the processor 7, the level of magnification is the ratio of the camera field angle to that of the display.

2. Minification: If the captured FOV 12 or ROI 13, 15 is displayed with a reduced field angle, the displayed images FOV 17, 18, 19 or ROI 21 images appear reduced. This is equivalent to fractional magnification.

3. Enhance contrast—this function permits contrast contained naturally in the image to be modified so as to enhance the difference between various levels of contrast to improve the detection of information in the image.

4. Enhance edges—this function permits the edge of an object to be detected and enhanced (for example, but not limited to, adding a black band) to improve the ability of the patient to perceive the edges of different features of the image.

5. Change to grey scale—this function permits the image to be converted to a grey scale from a color scale.

6. Threshold grey scale—this function permits all the colors and intensities of the image to be mapped into either black or white.

7. Remap colors—this function remaps the colors in the original image into another range of colors, thereby permitting color blindness or deficiency to be ameliorated.

8. Remap image based on the user's blind spot in ROI—this function allows the individual to remap the image to avoid the blind spots caused by diseased regions of the eye, such as in macular degeneration or Stargardt's disease. Various algorithms relocate pixels from behind a blind spot to areas near the periphery of the blind spot according to a mathematical spatial distribution model.

9. Relocation and Enhancement of Text: This technique is a specific implementation of "Spatial Remapping" above, where text is moved out from behind a blind spot. The technique includes application sensitive techniques such as only splitting the image on the blank lines between text lines, serif removal, text edge smoothing, text enhancement through color and contrast improvement, optical character recognition (OCR), etc.

10. Brightness adjustment: Individual pixels can be modified to increase or decrease their brightness either globally or according to a mathematically defined spatial distribution.

11. Brightness flattening: The variation in brightness across an image can be reduced, such that "hotspots" or washed out regions are darkened, and dark areas are brightened.

12. Image Superpositioning: This is a technique where peripheral information is overlaid into a central area of the FOV, in order to provide contextual data to people with lost peripheral visual performance.

14. Color Identification: The invention can identify (via screen text) the dominant color or the statistical red-green-blue (RGB) content for a specific portion of the image, as identified for example by "cross-hairs."

15. Black/White Conversion and Inversion: Color or grayscale images can be reduced to B/W or inverted B/W (WB).

By using fast processors it is possible to make these modifications in substantially real time. This allows a visually impaired individual to function substantially as if there were no visual defect. With a fast enough computer, these enhancements may be applied and removed sequentially to an image, that is the image toggled between the actual image or the image as modified, by the user so that the user sees the original image and the enhanced image as a repeating toggled sequence. This provides the user with a clearer sense about what aspects of the presented image are "real" and which are "enhancements".

Further certain enhancements can be applied and removed from the image automatically. For example, an edge enhancement modification can be applied and removed sequentially and repetitively such that the user sees an edge enhanced image and then the unmodified image.

Many algorithms can be used to achieve these purposes. For example, one embodiment of an edge finding algorithm detects edges using a gradient operator. To avoid noise due to small natural variations in intensity of the image, the gradient operator is applied to a low pass digitally filtered version of the image. If the digital filter is a Gaussian, then the gradient of the filtered image is simply the convolution of the image with the gradient of the filter; the Canny Gradient Operator. This technique has two major advantages. Firstly, this technique avoids the issue of having to calculate a finite derivative of the natural image. Although the derivative of the Gaussian function is known analytically, the derivative of the natural image is mathematically ill-posed. Second, this technique permits both the filtering and derivative operations to be performed simultaneously in Fourier space. This is represented by:

$$\nabla f_\sigma(x,y) = (f * \nabla g_\sigma)(x,y)$$

where $f$ and $f_\sigma$ are the unfiltered and filtered images respectively and $g_\sigma$ is the Gaussian filter. The amount of filtering applied will be controlled by the Gaussian width ($\sigma$). One embodiment of the implementation separates the gradient operator into its two Cartesian coordinates, so that in its final form the gradient is:

$$M_\sigma(x, y) = \sqrt{((\nabla_x f_\sigma(x, y))^2 + ((\nabla_y f_\sigma(x, y))^2}$$

$$\nabla_x f_\sigma(x, y) = \left(f * \frac{\delta g_\sigma}{\delta y}\right)(x, y)$$

-continued $$\Theta_\sigma(x, y) = a\tan\left(\frac{(\nabla_y f_\sigma(x, y))}{(\nabla_x f_\sigma(x, y))}\right)$$

Figure 7A:
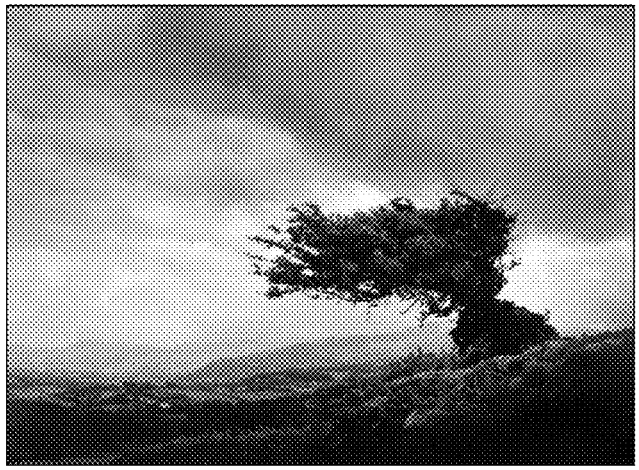
FIGS. 7A to 7C depict the results of an embodiment of an image enhancement algorithm that enhances the edges of objects.
Figure 7B:
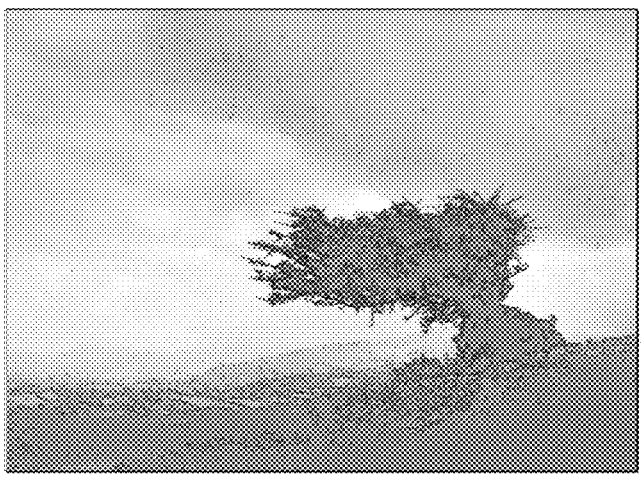
Figure 7C:
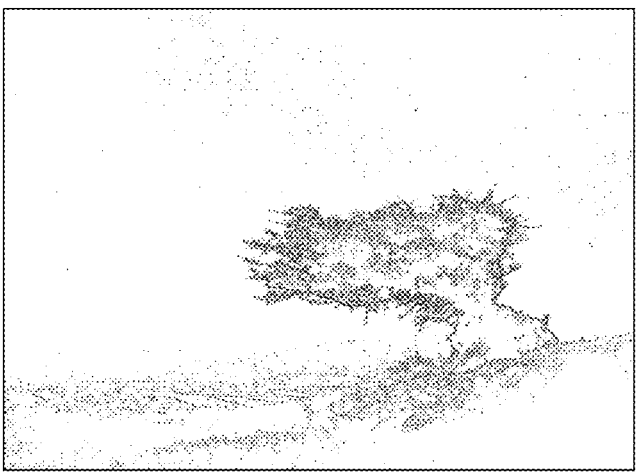

This generates an amplitude term (M) which is the vector sum of the two components and a direction component (θ). The result of this filtering is a gradient map which does not show edges specifically. The gradient image is then processed to identify edges by first using a bi-linear interpolation around each point in the image to identify the points which are local maxima. Once identified, only the local maxima are retained and all other points are ignored. Then the direction of the gradient is used to identify adjacent points which are connected, because the gradient will be similar for adjacent points if they are part of the same edge. Other outliers in the gradient are rejected. Finally, a thresholding algorithm is applied which retains all gradient points having a value in the upper percentile (in one embodiment, threshold 1, the 90th) and rejects all weak gradients having a value in the lower percentile (in one embodiment, threshold 2, the lowest 20th). Anything in between the two thresholds is rejected if it has no strong companion near it, and kept if its neighborhood indicates an edge. All retained gradient points are then binarized to 1, all others to 0, creating the outline of edges in the image. FIG. 7A depicts an image in its natural state. FIG. 7B depicts the image of FIG. 7A with a gradient applied, and FIG. 7C depicts the image of FIG. 7B with suppression of the underlying image.

Similarly, an example of a color remapping algorithm is next described. Normally sighted people depend on both brightness and color differences (luminance and color contrast) to identify features in their visual field. Abnormal color vision will often result in the inability to distinguish between colors; a reduced capacity to use color contrast to extract information. Color confusion is usually asymmetric, so that color confusion occurs along the Red-Green or Yellow-Blue color axis. This means that by remapping colors in the field of view which are confusing to an observer to color in the spectrum which offer better contrast, it is possible for the user to recover the information content of the field of view.

The algorithm described below is intended to remap the color contained in the field of view to allow the user to extract maximum content information. The color content of the processed field of view will not be true to the real world thus actual color information will not always be natural, but the color contrast will be enhanced for the observer so that there will be little or no confusion due to reduced color contrast between the objects in the field of view. This will allow the observer to identify a maximum number of details and maximize information extraction.

Figure 8:
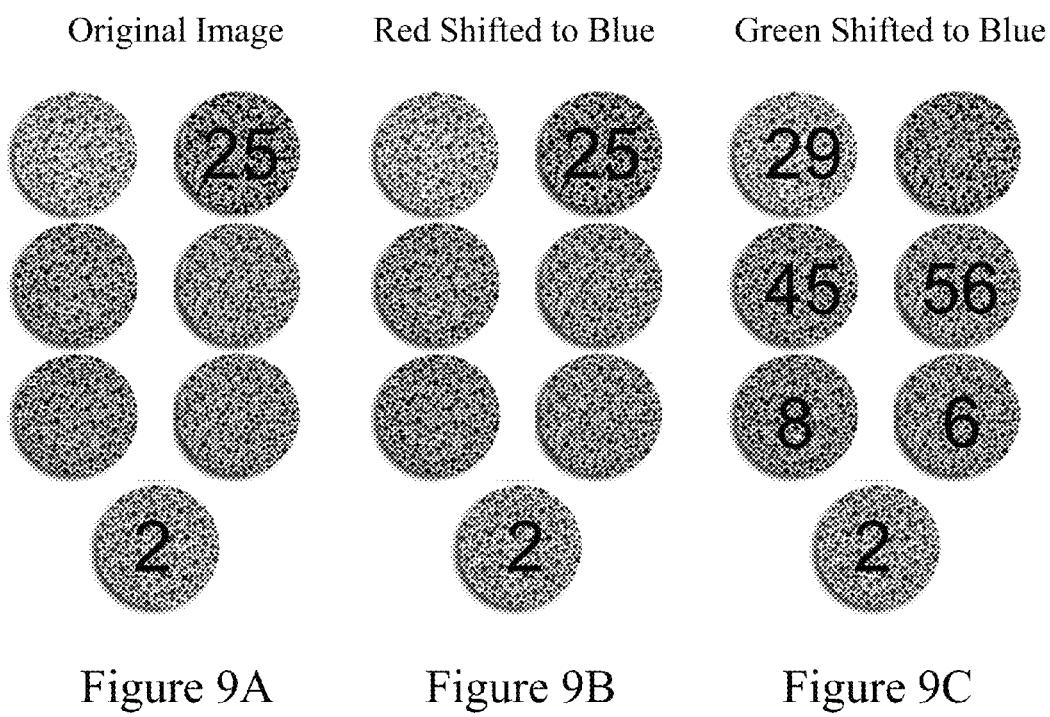
FIG. 8 is a flowchart describing an embodiment of an algorithm to modify colors in order to improve the usability of an image for people with specific color deficiencies.
Figure 8:
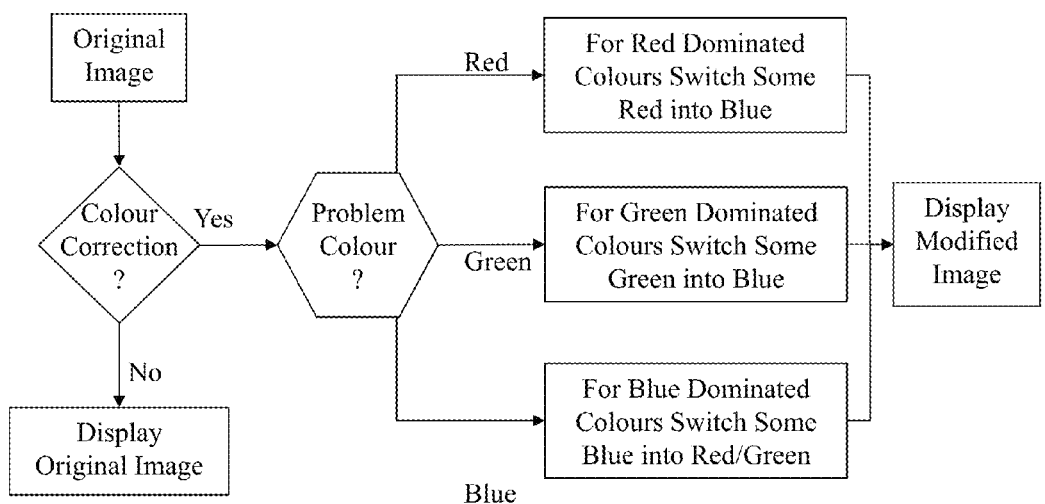

The algorithm is illustrated in FIG. 8. If a color perception defect is identified in a patient, then the image is modified by shifting some of the color in the defective color channel (Red-Green or Blue-Yellow) in the other color channel. Two parameters are typically required. The first is to identify which colors in the image must be modified, and the second is to determine the amplitude of the color shift necessary to move the affected colors to the unaffected color channel.

First, the colors to be modified are selected by the amount of the affected primary color (Red, Green or Blue) in the image. For example, if the color defect is the inability to detect color contrast in the red/green channel, then either the reds or greens are shifted to the blue channel; whichever gives the observer the best contrast. Given that White will contain 33% of each Red, Blue and Green primary color, then the threshold for shifting a given primary color should be >33%. The threshold will be both observer and image dependent and will need to be adjustable. The amount of remapping to the better color channel will also be observer dependent as well as image dependent and thus it too will also need to be adjustable.

For each point in the image, where R, G and B represents the intensity of each primary color, the algorithm proceeds as follows:

First, the RGB values are measured, and the brightness (T) (T=R+G+B) and the normalized color values (r, g, b) (r=R/T, g=G/T, b=B/T) calculated. Next, for each point in the image where the color contains more than the threshold amount of the problematic primary color, a percentage, shf, of the problem primary is shifted into another primary color.

For example, if (r) is the normalized value of the problematic color then:

If r>0.4 then red the primary color is more than 40% of the color of the image and hence above the threshold.

r(n)=(1−shf(r)), where r is the normalized value of the problematic color, and r(n) is the new normalized value for the shifted red primary color. Similarly, b(n)=b+sh*r where b(n) is the new normalized value for blue primary. Finally, g(n)=g which means the normalized primary color green (g) is unmodified.

One skilled in the art would recognize that if red is not the problematic color, then similar shifts are possible for the other primary colors. Thus, if the problem primary color is green (g) then the algorithm will shift some of the primary green color (g) into blue. Similarly, if the primary color blue is the problem, then the algorithm will shift blue into red.

The new RGB coordinates of the point being examined is then the new normalized shifted color times the brightness, T. Thus R(n)=r(n)*T, G(n)=g(n)*T, and B(n)=b(n)*T. The results of this algorithm are shown in FIGS. 9A-c.

An embodiment of the algorithm for automatic brightness and contrast enhancement transforms the image based on the intensity (signal) histogram distribution for the whole image. This technique is usually referred to as brightness/contrast equalization. An intensity distribution (number of pixels at each intensity levels), DA, from the original image (A) is remapped into a new image (B) with distribution, DB, with the constraints that the remapping result be single valued (each intensity level in DA can only transform to a single intensity level in DB) and that the transform be reversible or monotonic.

These constraints are embodied in the equations:

$D_B = f(D_A)$; and $D_A = f^{-1}(D_B)$.

Many different transforms can be used that meet these constraints. One embodiment is the algorithm discussed below. This algorithm is a simple and effective approach that is widely used in the image processing world.

This embodiment of the algorithm adds additional constraints to the determining the mapping function $f(D_A)$. In one embodiment, an additional requirement is that the energy contained within a small region ($dD_A$) of the distribution $D_A$ must equal the energy to the corresponding region $dD_B$ of the distribution $D_B$. That is:

$h_A * dD_A = h_B * dD_B$ where h is the number of pixels at a predetermined intensity level, (x). If the values of h are rescaled by dividing the value by the total number of pixels then the values of h can be expressed as probability distributions $p_A$ and $p_B$. Furthermore, because the intensity distribution is being stretched from the original image (0 to a maximum intensity, $D_M$) and because the area under the two probability distributions must be equal as described above, then the derivative of the transfer function df=df(s)/dx, can be set to a constant equal to $D_M$. The transform function is then rewritten in terms of the probability distribution $p_A$ and $D_M$:

$f(D_A) = D_M * \int p_A(u) du = D_M * F_A(D_A)$ where $F_A(D_A)$ is the cumulative distribution function for the original image. The implementation then becomes:

First, obtain an intensity distribution function for the original image with the same number of bins available as there are available grey levels for the display mode (that is, 8 bits gives you 256 potential bins.)

Next, normalize the distribution function by dividing it by the number of pixels to convert the distribution function to a probability function.

Third, find the largest gray level with a non-zero value in the original image and set this to $D_M$.

Next create a cumulative distribution function: For example bin 0 is the number of pixels of brightness=0; bin 1 is sum of the number of pixels in bin 0 and 1; bin 2 is sum of pixels in bins 0, 1, 2; and so on.

Fifth, for each pixel, obtain the intensity, I(c, r) where c and r are the column and row indices, and find the cumulative probability for that intensity I(c, r); a value between 0 and 1.

Fifth, for each pixel, obtain the intensity, I(c, r) where c and r are the column and row indices, and find the cumulative probability for that intensity I(c, r); a value between 0 and 1.

Then multiply this value by $D_M$. This is the new value of the intensity for that pixel, after equalization.

Finally, to obtain stretching as well, multiply the new intensity value by the ratio of the maximum possible for display divided by $D_M$. This step ensures the maximum contrast. FIG. 9A shows a grey-scale image of a color blindness test image. FIGS. 9B and 9C depicts grey-scale images of the color blindness test image with the red shifted to blue and green shifted to blue, respectively. Thus a person with red-green color blindness would be able to easily see portions of the image which would normally appear hidden.

While the present invention has been described in terms of certain exemplary preferred embodiments, it will be readily understood and appreciated by one of ordinary skill in the art that it is not so limited, and that many additions, deletions and modifications to the preferred embodiments may be made within the scope of the invention as hereinafter claimed. Accordingly, the scope of the invention is limited only by the scope of the appended claims.

What is claimed is:

1. A method of augmenting sight for a user, the method comprising the steps of:
    obtaining a field of view image of a scene viewed by the user using a forward-facing two-dimensional image-capture device carried by the user;
    transmitting the obtained image to a processor carried by the user;
    selecting a region of interest within either the field of view image or a second image;
    selecting an image modification to be applied to the region of interest by the processor;
    operating, by the processor, upon the region of interest to create a modified region of interest image in response to the selected image modification;
    digitally combining the field of view image and the modified region of interest image such that the modified region of interest image replaces image content from the location of the region of interest of the field of view image to form a hybrid image; and displaying the hybrid image on a two-dimensional display device carried by the user;

wherein the field of view image is one of a plurality of field of view images captured by the forward-facing two-dimensional image-capture device and transmitted to the processor at a first frame rate;

the region of interest image is one of a plurality of region of interest images transmitted to the processor at a second frame rate; and the processor generates a plurality of hybrid display images by combining the plurality of field of view images at the first frame rate and the modified plurality of region of interest images at the second frame rate.

2. The method according to claim 1, wherein
the user cannot view the scene directly.

3. The method according to claim 1, wherein
the camera, processor, and display device form part of a head worn device detachably mounted to a frame carrying either a prescription lens or a pair of prescription lenses worn in the same manner as a pair of spectacles such that the head worn display is viewed by the user through the one of the prescription lens and the pair of prescription lenses when mounted to the frame.

4. The method according to claim 1, wherein
the processor is an electronic device wirelessly connected to both the display device and the camera, and
the display device forms part of a head worn device display together with a frame and either a prescription lens or a pair of prescription lenses such that the head worn display is worn in the same manner as a pair of spectacles and the display device is viewed by the user through the one of the prescription lens and the pair of prescription lenses.

5. The method according to claim 1, wherein
selecting the region of interest comprises:
  receiving a first indication relating to whether the selected region of interest is within the field of view image or from the separate region of interest image source;
  receiving a second indication relating to at least one of the size, shape, and location of the region of interest within the field of view image or from the separate region of interest image source;
  receiving a third indication relating to at least one of the size and shape of the modified region of interest to be displayed to the individual together with a preferred location of the modified region of interest to be displayed.

6. The method according to claim 1, wherein
the region of interest is determined by an eye tracking system employing averaging and damping established in dependence upon a usage model selected based upon the user's current activity.

7. A head worn system augmenting sight for a user comprising:
a forward-facing two-dimensional image-capture device, carried by the user, for obtaining a field of view image of a scene associated with the user;
a processor, carried by the user, the processor in communication with the two-dimensional image-capture device and a display, the processor for:
  establishing an indication of a region of interest within either the field of view image or a second image;
  establishing an image modification to be applied to the region of interest by the processor;
  modifying the region of interest to create a modified region of interest image;
  digitally combining the field of view image and the modified region of interest image such that the modified region of interest image replaces image content from the location of the region of interest of the field of view image to form a hybrid image; and
  transmitting the hybrid image to a two-dimensional display; and
the two-dimensional display which forms part of the head worn system to be worn by the user,
wherein the field of view image is one of a plurality of field of view images captured by the forward-facing two-dimensional image-capture device and transmitted to the processor at a first frame rate;
the region of interest image is one of a plurality of region of interest images transmitted to the processor at a second frame rate; and
the processor generates a plurality of hybrid display images by combining the plurality of field of view images at the first frame rate and the modified plurality of region of interest images at the second frame rate.

8. The head worn system according to claim 7, wherein
the user cannot view the scene directly.

9. The head worn system according to claim 7, wherein
the two-dimensional image-capture device and processor are wirelessly connected; and
the head worn system further comprises:
  a frame such that the head worn system is worn in the same manner as a pair of spectacles; and
  either a prescription lens or a pair of prescription lenses such that the two-dimensional image-capture device is viewed by the user through the one of the prescription lens and the pair of prescription lenses.

10. The head worn system according to claim 7, wherein
the two-dimensional image-capture device and processor also form part of the head worn system which is detachably mounted to a frame carrying either a prescription lens or a pair of prescription lenses worn in the same manner as a pair of spectacles such that the head worn display is viewed by the user through the one of the prescription lens and the pair of prescription lenses when mounted to the frame.

11. The head worn system according to claim 7, wherein
selecting the region of interest comprises:
  receiving a first indication relating to whether the selected region of interest is within the field of view image or from the separate region of interest image source;
  receiving a second indication relating to at least one of the size, shape, and location of the region of interest within the field of view image or from the separate region of interest image source;
  receiving a third indication relating to at least one of the size and shape of the modified region of interest to be displayed to the individual together with a preferred location of the modified region of interest to be displayed.

12. The head worn system according to claim 7, wherein
the region of interest is determined by an eye tracking system employing averaging and damping established in dependence upon a usage model selected based upon the user's current activity.

* * * * *